US011599723B2

(12) United States Patent
Beaver

(10) Patent No.: US 11,599,723 B2
(45) Date of Patent: Mar. 7, 2023

(54) SYSTEM AND METHOD OF COMBINING STATISTICAL MODELS, DATA MODELS, AND HUMAN-IN-THE-LOOP FOR TEXT NORMALIZATION

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 554 days.

(21) Appl. No.: 16/656,955

(22) Filed: Oct. 18, 2019

(65) Prior Publication Data

US 2020/0125801 A1 Apr. 23, 2020

Related U.S. Application Data

(60) Provisional application No. 62/747,394, filed on Oct. 18, 2018.

(51) Int. Cl.
*G06F 40/30* (2020.01)
*G06N 20/00* (2019.01)
*G06F 16/33* (2019.01)
*G06F 40/279* (2020.01)

(52) U.S. Cl.
CPC .......... *G06F 40/30* (2020.01); *G06F 16/3346* (2019.01); *G06F 40/279* (2020.01); *G06N 20/00* (2019.01)

(58) Field of Classification Search
None
See application file for complete search history.

(56) References Cited

U.S. PATENT DOCUMENTS

| 2015/0331936 | A1  | 11/2015 | Alqadah |            |
|--------------|-----|---------|---------|------------|
| 2016/0217128 | A1* | 7/2016  | Baum    | G06F 40/289 |
| 2016/0335244 | A1* | 11/2016 | Weisman | G06F 40/242 |
| 2018/0157643 | A1* | 6/2018  | Andrassy| G06F 40/30 |

OTHER PUBLICATIONS

Federico, M., et al., "IRSTLM: an Open Source Toolkit for Handling Large Scale Language Models," Ninth Annual Conference of the International Speech Communication Association, 2008, pp. 1618-1621.
Mikolov, T., et al., "Efficient Estimation of Word Representations in Vector Space," Proceedings of the International Conference on Learning Representations (ICLR), arXiv:1301.3781v3, 2013, 12 pages.
Ramos, J., "Using TF-IDF to Determine Word Relevance in Document Queries," Proceedings of the First Instructional Conference on Machine Learning, 2003, 4 pages.

(Continued)

*Primary Examiner* — Antim G Shah
(74) *Attorney, Agent, or Firm* — Meunier Carlin & Curfman LLC

(57) ABSTRACT

According to principles described herein, unsupervised statistical models, semi-supervised data models, and HITL methods are combined to create a text normalization system that is both robust and trainable with a minimum of human intervention. This system can be applied to data from multiple sources to standardize text for insertion into knowledge bases, machine learning model training and evaluation corpora, and analysis tools and databases

20 Claims, 2 Drawing Sheets

(56) References Cited

OTHER PUBLICATIONS

Rosenfeld, R. "The CMU Statistical Language Modeling Toolkit and its use in the 1994 ARPA CSR Evaluation," Proceedings of the Spoken Language Systems Technology Workshop, 1995, pp. 47-50.
Stolcke, A., "SRILM—An Extensible Language Modeling Toolkit," Seventh International Conference on Spoken Language Processing, 2002, 4 pages.
Search Report, dated Mar. 27, 2020, received in connection with EP Patent Application No. 19204191.1.
Davy, M., "A Review of Active Learning and Co-Training in Text Classification," Computer Science Technical Report, 2005, 39 pages.

\* cited by examiner

SYSTEM AND METHOD OF COMBINING STATISTICAL MODELS, DATA MODELS, AND HUMAN-IN-THE-LOOP FOR TEXT NORMALIZATION

CROSS REFERENCE TO RELATED APPLICATIONS

This application is a non-provisional patent application claiming priority to Provisional Patent Application Ser. No. 62/747,394, filed Oct. 18, 2018 which is hereby incorporated by this reference in its entirety as if fully set forth herein.

BACKGROUND

Field

Embodiments of the present invention relate to a system and method for normalizing text, and particularly normalizing text from various sources.

Background

In speech recognition, a language model (LM) is a graph of probabilities associated to word transitions from a known vocabulary, such as a word lattice. Word embedding is the collective name for a set of language modeling and feature learning techniques in natural language processing (NLP) where words or phrases from the vocabulary are mapped to vectors of real numbers. Some approaches to language model development include term frequency inverse document frequency (TF-IDF) and word similarity. For instance, vocabulary in the insurance domain is expected to differ greatly from vocabulary in the telecommunications domain. To create a LM for use in a specific domain, texts are gathered from various sources such as websites, chat logs, call logs, documentation, and other sources in that domain, but each such domain may use different terms or syntax for the same meaning. There is a need for a system and method to normalize text received from such various sources.

BRIEF SUMMARY OF THE DISCLOSURE

Accordingly, the present invention is directed to a system and method for combining statistical models, data models, and human-in-the-loop (HITL) normalization that obviates one or more of the problems due to limitations and disadvantages of the related art.

A computer product according to principles described herein includes computer executable code embodied in a non-transitory computer readable medium that, when executing on one or more computing devices performs a method of normalizing terminology and phrases within a language model for a language domain. The method includes receiving text from at least one source; extracting terms from the text; searching for the extracted terms with a digitized data model; discarding terms that are found in the digitized data model; discarding terms that have a related form in the digitized data model; assigning a priority to the new term based on context and probability of occurrence; identifying as a "new term" term that are not discarded; and adding the new term to the digitized data model based on the priority.

A method of normalizing text from various sources according to principles described herein includes receiving text from at least one source; extracting terms from the text; searching for the extracted terms with a digitized data model; discarding terms that are found in the digitized data model; discarding terms that have a related form in the digitized data model; assigning a priority to the new term based on context and probability of occurrence; identifying as a "new term" term that are not discarded; and adding the new term to the digitized data model based on the priority.

Further embodiments, features, and advantages of the system and method for combining statistical models, data models, and human-in-the-loop (HITL) normalization, as well as the structure and operation of the various embodiments of the system and method for combining statistical models, data models, and human-in-the-loop (HITL) normalization, are described in detail below with reference to the accompanying drawings.

BRIEF DESCRIPTION OF THE DRAWINGS

The accompanying figures, which are incorporated herein and form part of the specification, illustrate the system and method for combining statistical models, data models, and human-in-the-loop (HITL) normalization. Together with the description, the figures further serve to explain the principles of the system and method for combining statistical models, data models, and human-in-the-loop (HITL) normalization described herein and thereby enable a person skilled in the pertinent art to perform and use the system and method for combining statistical models, data models, and human-in-the-loop (HITL) normalization.

DETAILED DESCRIPTION

Reference will now be made in detail to embodiments of the system and method for combining statistical models, data models, and human-in-the-loop (HITL) normalization with reference to the accompanying figures. The same reference numbers in different drawings may identify the same or similar elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Figure 1:
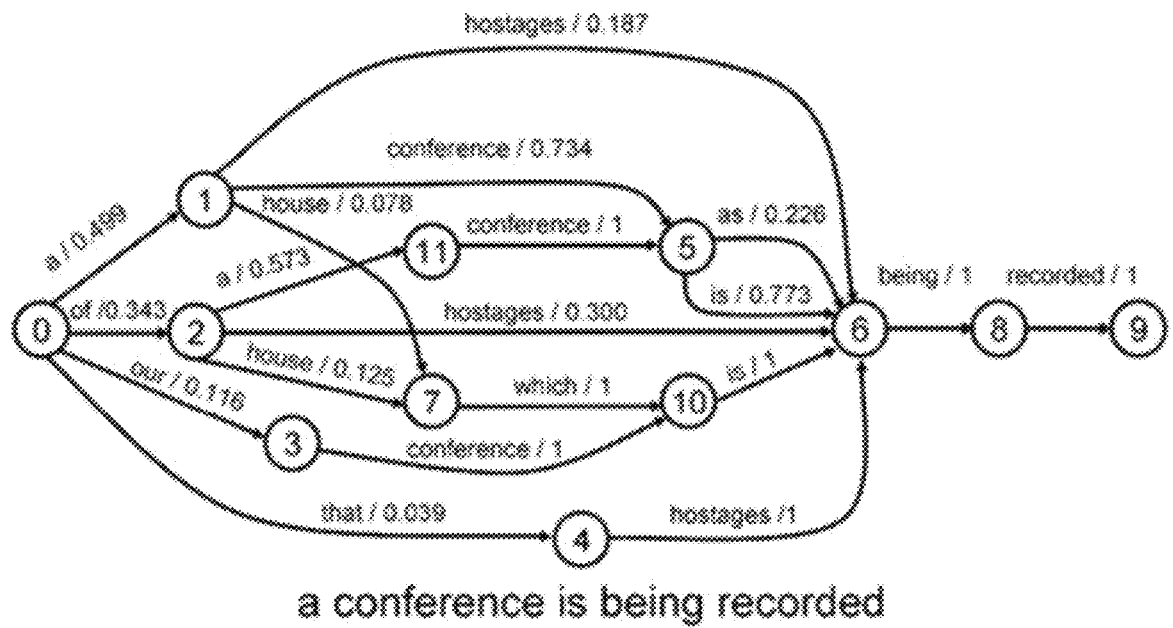
FIG. 1 is an example of a word lattice.

To create a language model (LM) for use in a specific domain, texts are gathered from various sources such as websites, chat logs, call logs, documentation, and other sources in that domain. Once the texts are aggregated, LM construction toolkits such as the CMU [1], SRI[2], or IRST [3] are applied to the data. They extract the vocabulary used within the texts and the statistics of their use with other vocabulary, such as unigrams, bigrams, and trigrams. These statistics can then be used to calculate a priori statistics of sentences that can be formed using the known vocabulary, which are organized in a lattice. A word lattice is an acyclic directed graph with a single starting node and edges labeled with a word and its corresponding probability of following the current word in the source texts. By following a path through the lattice from the starting point to any particular node, the a priori probability of that series of words (i.e. a sentence) appearing in the domain specific texts can be calculated. In the case of FIG. 1, the subject phrase is "a conference is being recorded." An example of algorithms as applied to traverse a word lattice can be found at www.slideserve.com/kipling/an-evaluation-of-lattice-scoring-using-a-smoothed-estimate-of-word-accuracy, which is incorporated herein in its entirety as background information.

A different approach to modeling word usage in context is to construct vectors to represent each word in a N-dimensional vector space. These vectors are manipulated during training based on observing where terms occur in the context of the surrounding terms. Terms that occur in the same context are moved closer to alignment. Terms that do not occur in the same context are moved further away. Once trained, the set of vectors can be used to reason about the similarity of words by performing vector arithmetic, such as measuring the distance between two points in the vector space. This approach is known as word embeddings [4], and is a way to group similar terms in a corpus together. Both the LM and word embedding approaches are unsupervised in that they require no human effort to construct. The training algorithms are simply given large training corpora and they use term positions and statistics within the corpora to build a model.

In contrast to models showing the statistical relationship between terms in a training corpora, data modeling approaches seek to define deeper relationships between terms such as hierarchies and negations. For such models there are two common structures used. The simpler form is a taxonomy, which is simply a tree of entities that form a hierarchy. For example, one could create a taxonomy of food where the entities are individual food items such as cheddar cheese, peas, corn, apples, pork, skim milk, etc. One would then create low level classes of foods like red meat, white meat, all cheese, all milk, families of fruits and vegetables, etc. Then one would group all of the specific individuals into the classes they belong and then would create higher level classes such as meat, fish, dairy, fruit, vegetables, etc. and group the classes of foods into the higher level classes. Finally, one can create the top layers of animal products, and non-animal products and put them under the root node of food. In this way, a taxonomy of food that you can go from specific examples to more and more general classes by following the tree backwards has been constructed. One can also do simple reasoning like parent-of or sibling-of relationships, and find the least common ancestor between two individuals, like animal products for milk and pork.

For many cases this tree structure is enough to model data and process it. But more complicated relationships, like multiple inheritance and applying logical assertions, require storing data and metadata in a graph form. This is where ontologies come in. An ontology is a directed graph with four primary components: individuals, classes, attributes, and relations. There are many more components possible like events and restrictions as well. Ontologies allow for very rich data modeling with complex relationships and logical inferences about the data. There are many ways to construct ontologies and several different syntaxes for expressing and storing them. Taxonomies and ontologies typically require some human effort to construct. They may be seeded by some statistical observations from corpora, but the relationships between terms are usually defined or refined by humans. These models are concerned with the logical inference that can be drawn from terms within them and therefore require at least some logical relations to be encoded within them by humans.

Figure 2:
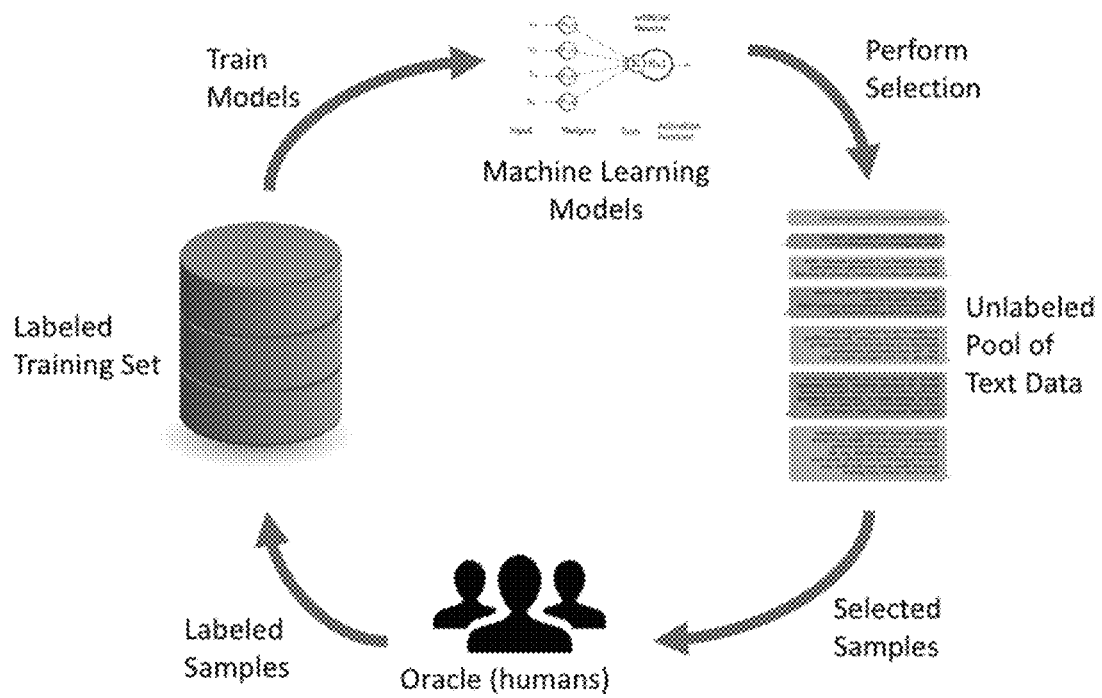
FIG. 2 illustrates an active learning process according to principles described herein.

Human-in-the-loop (HITL) is a sub-field of Machine Learning where the model requires some form of human interaction. A common HITL approach is known as Active Learning. With active learning an existing model is supplied with a large pool or stream of unlabeled samples. The model then chooses which samples it thinks would be most informative to know the label for based on a selection strategies, of which there are several commonly used. Human oracles are then shown the selected samples and give them labels. These labeled samples are added to the training data to retrain the model from. In this way the model will learn more quickly from less training data then given a large sample of labeled results that contain many duplicated features. This active learning process is shown in FIG. 2.

The present disclosure is concerned with the task of text normalization. With text normalization, the purpose is to ingest text from various sources such as IVRs, web pages, chats, social media, etc. and standardize the use of language within them to a common form. The common form improves downstream analysis and machine learning usage to allow language to be represented in a consistent form. A machine-learned model trained on text specific to one form of text such as Twitter data, will not perform well when applied to text from a different source, such as IVR logs, for example. This is because common terms used in Twitter such as "hashtags" or "mentions" do not occur in IVR transcripts. Therefore, to maximize the utility of text from one source, normalization is performed. For example, the instant messenger text:

Example 1

BRBK? ;)
can be normalized to the general text:

Example 2

Be right back okay? *wink*

Such normalization allows downstream tools to accurately model text meaning and statistics regardless of its origin. The task of text normalization includes many parts including such as cleansing, formatting, correcting misspelling and abbreviations, bringing terms to canonical form. Personal communication texts such as emails, instant messaging, and social media are particularly challenging due to their open vocabulary that continuously grows. There are constantly new products, applications, devices, terminology, slang and abbreviations being created and used within such communication channels. In order to deal with the evolving nature of internet language, text normalization methods should also be dynamic.

According to principles described herein a normalization system and method includes data models. Ontologies and/or taxonomies can be created for each specific language domain. An example of language domain may be insurance or travel. These data models are used to transform known forms (instances) of terms into a canonical form (the instance class).

In the normalization process according to principles described herein, a computer-based system, such as a processor, first consumes text from a source, such as Twitter. Individual terms from that source text are then extracted and searched for in the data model. If they are found as a class object, they are ignored as they are already in canonical form. If they are found as an instance, for example an abbreviation, the instance term is replaced with its class from the data model. When the term is not found in the data model, a different process is followed.

First, the LM or a word embedding model is consulted to determine if the term has been seen before If the term has been seen before, the probability of occurrence in the LM and similar terms in the embedding space are consulted to see if the term is similar to any "high-valued" terms, such as language specific in the language domain for which correct understanding is important. If the term is highly probable and/or it is related to important terms, such as products, in the domain, the term will have a high priority for adding to the data model. If the term is not probable or not related to any important terms in the existing data model, it will have a low priority.

Once terms cross a predefined threshold, which is adjustable based on the availability of human annotators, the terms are given to a human along with example context to be added to the data models. The predetermined threshold may be, for example, a number of times a term occurs in a time frame or number of words or an occurrence rate. This process of the model selecting its own training data is a special case of HITL known as Active Learning [5]. A human may then be included in the process to then add the term to the ontology either as an instance of an existing class which expresses the normal form, or as a new class to represent a new normal form for related terms if the human determines that the usage and addition of the term is appropriate.

If a term is not found in the LM and/or embedding model because it has not yet been observed, the term is added as a training example and recompute/recompile with that term (and/or the term in context, e.g. with surrounding words) as part of the model. The system will thus retrain the LM and embedding models including the text from which the term came from. This will add the new term into the vocabulary of the statistical models and they will recognize it going forward. In this way, as the new term is encountered in the future, it will gain priority to be added to the data model. For example, if a term is used more frequently over time, the model will incorporate the increased frequency and the term will gain priority in the model. The system thus may take into account addition usage in context or similar embeddings.

In any of the cases described above, a human may be "in the loop" to verify the model's treatment of a term. A human may offer suggestions as to where a term goes in the language model, the word embedding model, the data model or even instance class. A human may place or move the term manually within the system, or may even decline to include its normalized form into the model e.g., over ride the system, thereby realigning it training.

After the addition or removal of any term, and/or periodically or randomly, the system may perform batch processing to recompile to take into account changes in treatment of terms. Such changes could change probabilities and priorities according the to the changes in the usage of terms.

Figure 3:
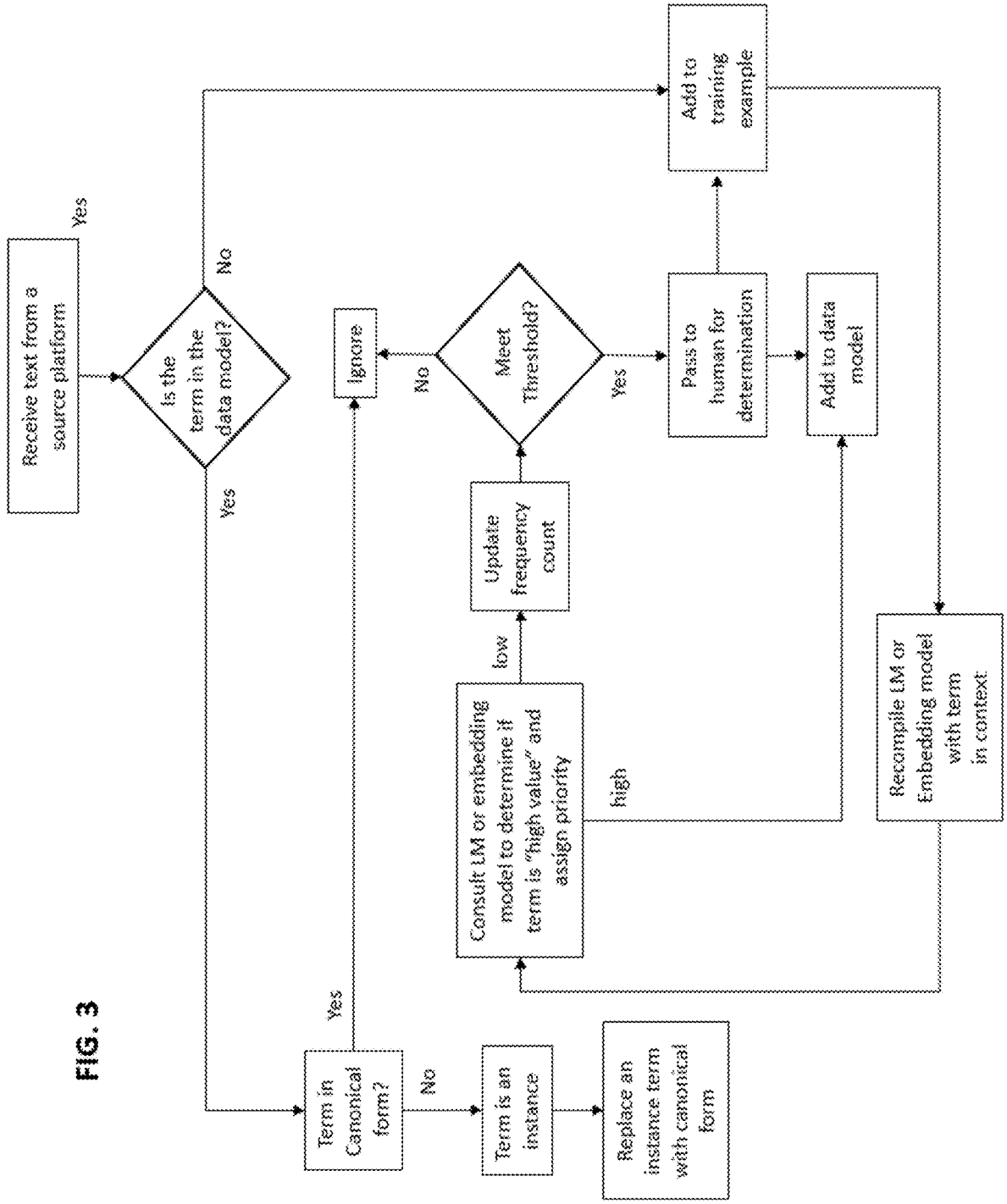
FIG. 3 is a flowchart showing an example set of steps for performing a method as described herein.

An exemplary flow of a method according to principles described herein is illustrated in FIG. 3. As can be seen in FIG. 3, when text is received from a source platform, the data model is checked to see if the terms in the text are in the data model. If the term received is in data model, the term is checked to determine if it is in canonical form. If yes, the term can be ignored. If the term is not in canonical form, the term must be an instance of an existing class as it has already been determined to exist in the data model. Therefore, the term is replaced with its canonical form. If the term does not exist in the data model, then the term is added to a training example, and the LM or word embedding model is recompiled with the term in context. The recompiling may be upon each receipt of text from a source or may be held for batch processing. After recompiling the term in the future may be replaced with a canonical form. Then the language model/word lattice or word embedding model is used to determine if there is a possibility that term is high value. If the probability is high, then the term is automatically added to the data model. If the probability is low, then a frequency count for observation of the term is updated/incremented until the count reaches a predetermined threshold If it does not meet the threshold, the term will continue to be ignored. If the frequency count reaches the threshold, then the term is passed to a "human in the loop" (HITL) to determine if the term should be added to the data model.

According to principles described herein, unsupervised statistical models, semi-supervised data models, and HITL methods are combined to create a text normalization system that is both robust and trainable with a minimum of human intervention. This system can be applied to data from multiple sources to standardize text for insertion into knowledge bases, machine learning model training and evaluation corpora, and analysis tools and databases.

Throughout this application, various publications may have been referenced. The disclosures of these publications in their entireties are hereby incorporated by reference into this application in order to more fully describe the state of the art to which this invention pertains:

[1] Ronald Rosenfeld. The cmu statistical language modeling toolkit and its use in the 1994 arpa csr evaluation. In Proceedings of the Spoken Language Systems Technology Workshop, pages 47{50, 1995}.

[2] Andreas Stolcke. Srilm-an extensible language modeling toolkit. In Seventh international conference on spoken language processing, 2002.

[3] Marcello Federico, Nicola Bertoldi, and Mauro Cettolo. Irstlm: an open source toolkit for handling large scale language models. In Ninth Annual Conference of the International Speech Communication Association, 2008.

[4] Tomas Mikolov, Kai Chen, Greg Corrado, and Jeffrey Dean. Efficient estimation of word representations in vector space. arXiv preprint arXiv:1301.3781, 2013.

[5] Burr Settles. Active learning. Synthesis Lectures on Artificial Intelligence and Machine Learning, 6(1):1{114, 2012.

www.slideserve.com/kipling/an-evaluation-of-lattice-scoring-using-a-smoothed-estimate-of-word-accuracy.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A non-transitory computer readable medium comprising instructions that, when executed by a processor of a processing system, cause the processing system to perform a method of updating a language model for a language domain, the method comprising:

receiving text from at least two source platforms having different source text forms, the source platforms comprising interactive voice response log, social media platform, web page, or chat;

extracting terms from the text in a source text form associated with a respective source platform to create a set of ingested terms;

searching for the extracted terms in the source text form within a digitized data model;

removing extracted terms that are found in the source text form in the digitized data model from the set of ingested terms;

removing extracted terms that have a related form in the digitized data model from the set of ingested terms;

identifying as a "new term" any term in the set of ingest terms that has not been discarded;

assigning a priority to the new term based on context and probability of occurrence; and automatically adding the new term in the source text form to the digitized data model based on the priority above a predetermined threshold; and recompiling the language model after the new term is added to the digitized data model for a specific domain to expand vocabulary of the language model.

2. The non-transitory computer readable medium of claim 1, wherein the priority is assigned based on probability of occurrence of the new term based on one of a language model and a word embedding model.

3. The non-transitory computer readable medium of claim 2, wherein a low priority is assigned if the probability of occurrence is below a predetermined value.

4. The non-transitory computer readable medium of claim 1, the method further comprising passing the new terms to a human for determination of whether the term should be added to the data model if the new term crosses a predetermined threshold.

5. The non-transitory computer readable medium of claim 4, further comprising the human adding information to the training model about usage of the new term.

6. The non-transitory computer readable medium of claim 4, wherein the predetermined threshold is based on frequency of occurrence of the new term.

7. The non-transitory computer readable medium of claim 1, wherein adding the new term to the digitized data model comprises adding the new term to a training model of the digitized data model and recompiling the digitized data model based on the training model.

8. The non-transitory computer readable medium of claim 7, the method further comprising passing the new terms to a human for determination of whether the term should be added to the training model of the digitized data model if the new term crosses a predetermined threshold.

9. The non-transitory computer readable medium of claim 8, the method further comprising the human adding information to the training model about usage of the new term.

10. The computer program product of claim 1, the method further comprising adding the new term in a normal text form different from the source text based on the priority below the predetermined threshold.

11. A method of updating a language model for a language domain, comprising:

receiving text from at least two source platforms having different source text forms, the source platforms comprising interactive voice response log, social media platform, web page, or chat;

extracting terms from the text in a source text form associated with a respective source platform to create a set of ingested terms;

searching for the extracted terms in the source text form within a digitized data model;

removing extracted terms that are found in the source text form in the digitized data model from the set of ingested terms;

removing extracted terms that have a related form in the digitized data model from the set of ingested terms;

identifying as a "new term" any term in the set of ingest terms that has not been discarded;

assigning a priority to the new term based on context and probability of occurrence; and automatically adding the new term in the source text form to the digitized data model based on the priority above a predetermined threshold; and recompiling the language model after the new term is added to the digitized data model for a specific domain to expand vocabulary of the language model.

12. The method of claim 11, wherein the priority is assigned based on probability of occurrence of the new term based on one of a language model and a word embedding model.

13. The method of claim 12, wherein a low priority is assigned if the probability of occurrence is below a predetermined value.

14. The method of claim 11, further comprising passing the new terms to a human for determination of whether the term should be added to the data model if the new term crosses a predetermined threshold.

15. The method of claim 14, further comprising the human adding information to the training model about usage of the new term.

16. The method of claim 14, wherein the predetermined threshold is based on frequency of occurrence of the new term.

17. The method of claim 11, wherein adding the new term to the digitized data model comprises adding the new term to a training model of the digitized data model and recompiling the digitized data model based on the training model.

18. The method of claim 17, further comprising passing the new terms to a human for determination of whether the term should be added to the training model of the digitized data model if the new term crosses a predetermined threshold.

19. The method of claim 18, further comprising the human adding information to the training model about usage of the new term.

20. The method of claim 11, further comprising adding the new term in a normal text form different from the source text based on the priority below the predetermined threshold.

* * * * *